(12) United States Patent
Bo et al.

(10) Patent No.: US 11,858,031 B2
(45) Date of Patent: Jan. 2, 2024

(54) METHOD AND SYSTEM OF CASTING INTEGRAL MULTI-WAY VALVE BASED ON 3D PRINTING

(71) Applicant: JIANGSU XCMG CONSTRUCTION MACHINERY RESEARCH INSTITUTE LTD., Jiangsu (CN)

(72) Inventors: Fuxiang Bo, Jiangsu (CN); Bing He, Jiangsu (CN); Pengfei Chen, Jiangsu (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 115 days.

(21) Appl. No.: 17/428,546

(22) PCT Filed: Nov. 26, 2020

(86) PCT No.: PCT/CN2020/131735
§ 371 (c)(1),
(2) Date: Aug. 4, 2021

(87) PCT Pub. No.: WO2021/147505
PCT Pub. Date: Jul. 29, 2021

(65) Prior Publication Data
US 2022/0193756 A1 Jun. 23, 2022

(30) Foreign Application Priority Data
Apr. 17, 2020 (CN) .......................... 202010305784.4

(51) Int. Cl.
*B22C 9/02* (2006.01)
*B22C 3/00* (2006.01)
(Continued)

(52) U.S. Cl.
CPC .................. *B22C 9/02* (2013.01); *B22C 3/00* (2013.01); *B22C 9/082* (2013.01); *B22C 9/088* (2013.01);
(Continued)

(58) Field of Classification Search
CPC .... B22C 3/00; B22C 9/02; B22C 9/08; B22C 9/082; B22C 9/088; B22C 9/10; B22C 9/24
(Continued)

(56) References Cited

FOREIGN PATENT DOCUMENTS

| CN | 102699282 A | 10/2012 |
|---|---|---|
| CN | 109550903 A | 4/2019 |

(Continued)

OTHER PUBLICATIONS

Office Action dated Sep. 28, 2022 in German Patent Application No. 112020000378.7.
(Continued)

*Primary Examiner* — Kevin P Kerns
(74) *Attorney, Agent, or Firm* — Venable LLP

(57) ABSTRACT

A method and system of casting an integral multi-way valve based on 3D printing belong to the technical field of valve casting. The casting method and system determine, according to structural parameters of an integral multi-way valve to be cast, a plurality of ingates on a plurality of layers, a plurality of runners connecting the ingates on each layer, and a sprue connecting the plurality of runners, and an integral sand mold is printed by using the 3D printing technology to realize a multi-layer composite casting method and a corresponding casting system.

7 Claims, 3 Drawing Sheets

(51) Int. Cl.
    *B22C 9/08* (2006.01)
    *B22C 9/10* (2006.01)
    *B22C 9/24* (2006.01)
    *B33Y 10/00* (2015.01)
    *B33Y 80/00* (2015.01)
(52) U.S. Cl.
    CPC ................ *B22C 9/10* (2013.01); *B22C 9/24* (2013.01); *B33Y 10/00* (2014.12); *B33Y 80/00* (2014.12)
(58) Field of Classification Search
    USPC ........ 164/15, 23, 24, 516, 45, 349, 361, 369
    See application file for complete search history.

(56) References Cited

FOREIGN PATENT DOCUMENTS

| | | |
|---|---|---|
| CN | 110465630 A | 11/2019 |
| CN | 110523922 A | 12/2019 |
| CN | 110666106 A | 1/2020 |
| CN | 111468678 A | 7/2020 |
| EP | 1223118 A1 | 7/2002 |
| JP | 2017127883 A | 7/2017 |
| WO | 2014093684 A1 | 6/2014 |

OTHER PUBLICATIONS

International Search Report and Written Opinion dated Feb. 25, 2021 in International Application PCT/CN2020/131735.

METHOD AND SYSTEM OF CASTING INTEGRAL MULTI-WAY VALVE BASED ON 3D PRINTING

CROSS REFERENCE TO RELATED APPLICATIONS

The present application is a national stage application, filed under 35 U.S.C. § 371, of International Application PCT/CN2020/131735, filed on Nov. 26, 2020, which claims priority to Chinese Patent Application No. 202010305784.4, filed on Apr. 17, 2020 and entitled "METHOD AND SYSTEM OF CASTING INTEGRAL MULTI-WAY VALVE BASED ON 3D PRINTING", the disclosures of which are incorporated herein by reference in their entireties.

FIELD

The present disclosure relates to the technical field of additive manufacturing of construction machinery, in particular to a method and a system of casting an integral multi-way valve based on 3D printing.

BACKGROUND

A large integral hydraulic multi-way valve, which is a core control element of construction machinery and located between a pump and an actuating element, is used for controlling the rate of flow and flow direction of hydraulic oil, so as to centrally control the movement direction and speed of the actuating element. It is widely applied to fields such as construction machinery, mining machinery, port machinery, etc. The performance of the large integral multi-way valve directly affects the overall working performance of a product, and affects the reputation and sales of the complete product.

Due to the elongated main valve opening of the valve body of the integral hydraulic multi-way valve, complicated inner oil passages, many suspended structures, many oil grooves, different cross-sectional shapes and sizes and high casting difficulty, the casting success rate of the integral hydraulic multi-way valve is relatively low. At present, the large integral hydraulic multi-way valve is manufactured usually by using the traditional sand casting process. According to a design model, a metal mould is manufactured at first, then a sand mold is manufactured by using the metal mould, and finally casting is completed to obtain a hydraulic valve blank. The traditional manufacturing method is long in manufacturing period of the mould and high in mould cost, which are not conducive to multiple times of modifications of the model in the design stage and limit rapid replacement of the large integral hydraulic multi-way valve.

At present, sand mold 3D printing has high success rate when being applied to aluminum alloy castings and thick and large parts. However, the strength of the sand mold quickly manufactured based on the sand mold 3D printing process is much lower than that of a sand mold manufactured by the traditional mould, especially for the large integral hydraulic multi-way valve with a complex internal structure, many tiny structures, many suspension structures and other features, there are generally problems such as low rapid casting success rate and poor forming quality, casting defects such as broken cores and fins are likely to occur in the pouring process, the process is immature, and the demand for industrial application is difficult to satisfy.

SUMMARY

The technical solution adopted in the present disclosure is as follows:

In a first aspect, the present disclosure provides a method of casting an integral multi-way valve, including:
  obtaining structural parameters of a valve to be cast;
  obtaining a valve body height L of the valve to be cast by taking a direction vertical to an axial direction of a main valve opening as a height direction;
  obtaining the number of layers of ingates according to the valve body height L;
  obtaining positions of various ingates on each layer according to the structural parameters of the valve to be cast, so that all ingates are located on the same side of the valve to be cast;
  arranging ingate models with corresponding layers and positions according to the structural parameters of the valve to be cast;
  respectively arranging runner models connecting ingates corresponding to the ingates on each layer;
  arranging a riser model and a sprue model connecting the runners;
  creating a sand core model to be subjected to 3D printing, and a sand mold model comprising the ingates, runners, a sprue and a riser according to the structural parameters of the valve to be cast, the ingate models, the runner models, the sprue model and the riser model;
  performing 3D printing according to the sand mold model and the sand core model to obtain the sand mold and sand core of the valve to be cast; and
  performing pouring by using the sand mold and sand core obtained from 3D printing to obtain an integral valve body.

The present disclosure provides a multi-layer composite casting method using a side-pouring mode, which can disperse and balance the influence of gravity and scouring force and the like in the liquid filling process; moreover, the 3D-printed sand mold is an integral sand mold, there is no bonding gap inside the sand mold, the surface quality of a valve body casting after completion of pouring can be ensured, and at the same time the integral hydraulic valve can be rapidly casted and is suitable for batch and standardized manufacturing.

After the structural parameters of the valve to be cast are determined, a body model of the integral multi-way valve to be cast may be generated to facilitate more intuitive arrangement of positions of the ingates, the runners, the sprue, the riser, etc.

In some embodiments, the method of casting an integral multi-way valve further includes:
  arranging a through-type exhaust passage in a part of the sand core corresponding to the main valve opening;
  arranging a conformal exhaust hole in a corresponding part of the sand core corresponding to other valve openings other than the main valve opening and configured to be connected to a sand mold periphery. That is, the path of the exhaust holes is disposed along the central path of the valve openings. The arrangement of the exhaust passage and the exhaust holes can improve the exhaust efficiency of the integral sand core.

In some embodiments, the method of casting an integral multi-way valve further includes: before pouring, dip-coating the sand mold obtained by 3D printing with zircon powder paint, and then drying.

In some embodiments, the zircon powder paint with a Baume degree between 40 and 60 is used for dip coating for not more than 3 times, the drying temperature is 100-180° C., and the drying time is set to be 1-1.5 h.

In some embodiments, the method of casting an integral multi-way valve further includes: selecting a 3D sand mold printing process for sand core printing according to the weight of the valve to be cast:
if the weight of the valve to be cast is less than or equal to 50 kg, using a selective laser sintering technology or a binder jet printing technology for sand core 3D printing; and
if the weight of the valve to be cast is more than 50 kg, using the binder jet printing technology for sand core 3D printing. Cases such as reduction of broken sand core can be further ensured.

In some embodiments, the valve to be cast is an integral hydraulic multi-way valve; when pouring, nodular cast iron is used for pouring, the pouring temperature is 1350-1400° C., and the thermal insulation time after pouring is more than or equal to 8 h.

In some embodiments, the step of determining the number of layers N of the ingates according to the valve body height L is: dividing the valve body height L by a preset height interval L0, and approximately rounding the result obtained to obtain the number of layers N. Approximate rounding may be rounding-off approximation, or may be an integer part of the quotient. The preset height interval L0 can be adjusted as needed, such as 100 mm, etc. When the ingates on each layer are specifically arranged, it is better to evade positions that are flush with the main valve opening of each path, for example, they can be disposed between positions flush with two layers of main valve openings.

In some embodiments, different ingates located on the same layer have at least one height. That is, in the present disclosure, the ingates on the same layer can be disposed at different heights to meet other structural requirements, such as evading structural positions that are not suitable for being directly scoured.

In some embodiments, the ingates are disposed away from inner oil passages of the sand mold. It can ensure that oil passage parts of the sand core will not be directly scoured in the liquid filling process, and casting defects such as broken cores and fins due to the impact of molten iron in the casting process can be reduced.

In a second aspect, the present disclosure further provides a system of casting an integral multi-way valve, including a sand mold body, a sprue, runners, ingates and a riser;
a direction vertical to an axial direction of a main valve opening part of the sand core is taken as a height direction of a sand mold body;
the sprue, the runners and the ingates are disposed on one side of the sand mold body; a plurality of runners are disposed along the height direction of the sand mold body, a plurality of ingates are provided in the extension direction of each of the runners, and each of the runners is connected to the sand mold body through the plurality of ingates; the runners are connected to the sprue, and the riser is disposed on the top of the sand mold body.

In some embodiments, the number of the runners is set to be a result value obtained by approximately rounding the result obtained by dividing the valve body height L by a preset height interval L0;
all the ingates connected to a single runner have at least two heights, and each ingate is disposed away from inner oil passages of the sand mold;
the wall thickness of the sand mold periphery is more than or equal to 25 mm;
a through-type exhaust passage is disposed in a part of the sand core corresponding to the main valve opening; and
parts of the sand core corresponding to the valve openings other than the main valve opening and connected to the sand mold periphery are each provided with a conformal exhaust hole.

In some embodiments, a plurality of risers are provided; all the ingates are disposed on a lateral part of one side of the sand mold parallel to the axial direction of the main valve opening. That is, the side where the ingates are located is not the top surface or bottom surface of the sand mold.

BRIEF DESCRIPTIONS OF THE DRAWINGS

Figure 1:
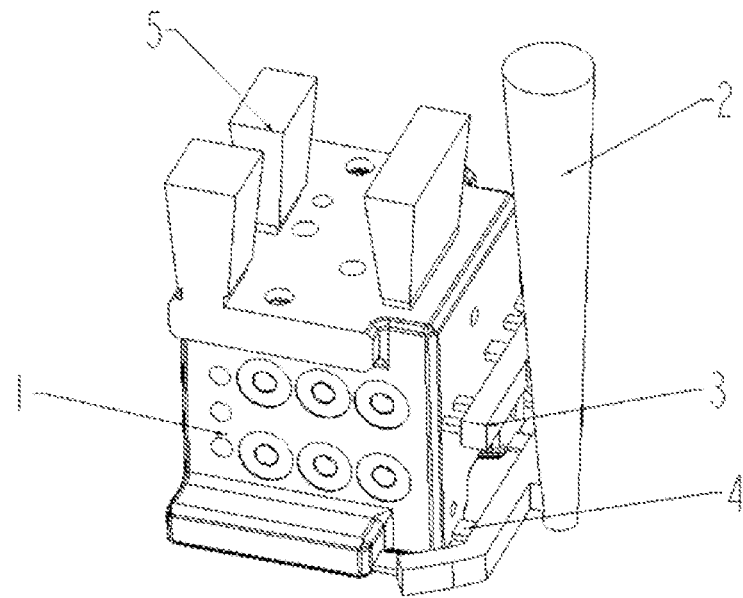
FIG. 1 is a schematic diagram showing positions of inner ingates, runners, a sprue, and risers of an embodiment of the present disclosure.

In FIGS. 1-5: 1 integral multi-way valve, 2 sprue, 3 runner, 4 (41-42, 42-1 to 42-5) ingate, 5 riser, 61 (62) main valve opening part of sand core, 63-67 inner oil passage part of sand core, 71-72 exhaust passage at position of main valve opening, 73 conformal exhaust hole.

DETAILED DESCRIPTION OF THE EMBODIMENTS

Further description will be made below in conjunction with drawings and specific embodiments.

The inventive concept of the present disclosure is: a plurality of ingates on a plurality of layers, a plurality of runners connecting the ingates on each layer, and a sprue connecting the plurality of runners are determined at first according to structural parameters of an integral multi-way valve to be cast, and an integral sand mold is printed by using the 3D printing technology to realize a multi-layer composite casting method and a corresponding casting system, which can disperse the influence of gravity and scouring force and the like in the liquid filling process, reduce casting defects such as broken sand core, internal defective fins and curved main valve openings, realize rapid casting and at the same time ensure quality stability of the formed valve.

The present disclosure provides a multi-layer composite casting method adopting a side-pouring mode and a corresponding casting system. The multi-layer composite casting method can disperse and balance the influence of gravity and scouring force and the like in the liquid filling process and reduce casting defects such as broken sand core, internal defective fins and curved main valve openings. Moreover, the 3D-printed sand mold is an integral sand mold, there is no bonding gap inside the sand mold, the sand mold has good consistency, the surface quality and quality stability of a valve body casting after completion of pouring can be ensured, and at the same time the integral hydraulic valve can be rapidly casted and is suitable for batch and standardized manufacturing, can better support rapid replacement of large integral hydraulic multi-way valve products, greatly reduce trial production costs, shorten trial production cycles, and further realize industrial application of the sand mold 3D printing technology.

The current embodiment is a method of casting an integral multi-way valve based on 3D printing, including:
- obtaining structural parameters of a valve to be cast;
- obtaining a valve body height L of the valve to be cast by taking a direction vertical to an axial direction of a main valve opening as a height direction;
- obtaining the number of layers of ingates according to the valve body height L;
- obtaining positions of ingates on each layer according to the structural parameters of the valve to be cast, so that all ingates are located on the same side of the valve to be cast;
- arranging ingate models with corresponding layers and positions according to the structural parameters of the valve to be cast;
- respectively arranging runner models connecting ingates corresponding to the ingates on each layer;
- arranging a riser model and a sprue model connecting the runners;
- creating a sand core model to be subjected to 3D printing, and a sand mold model comprising the ingates, runners, a sprue and a riser according to the structural parameters of the valve to be cast, the ingate models, the runner models, the sprue model and the riser model;
- performing 3D printing according to the sand mold model and the sand core model to obtain the sand mold and sand core of the valve to be cast; and
- performing pouring by using the sand mold and sand core obtained from 3D printing to obtain an integral valve body.

The present disclosure provides a multi-layer composite casting method using a side-pouring mode, which can disperse and balance the influence of gravity and scouring force and the like in the liquid filling process; moreover, the 3D-printed sand mold is an integral sand mold, there is no bonding gap inside the sand mold, the surface quality of a valve body casting after completion of pouring can be ensured, and at the same time the integral hydraulic valve can be rapidly casted and is suitable for batch and standardized manufacturing.

The following embodiments specifically introduce the method of casting an integral multi-way valve by taking the valve to be cast being an integral hydraulic multi-way valve as an example.

Figure 2:
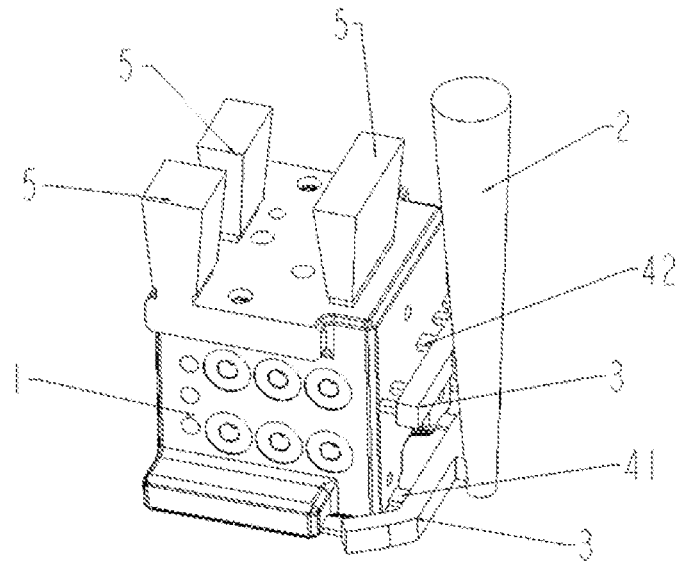
FIG. 2 is a detailed schematic view showing parts of FIG. 1.
Figure 3:
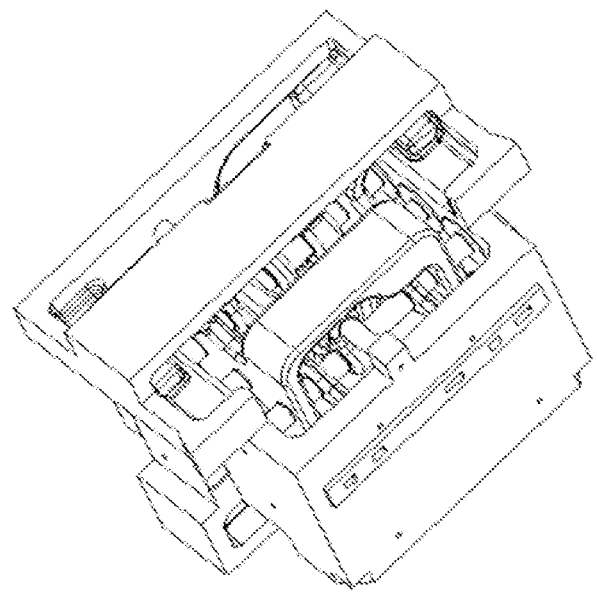
FIG. 3 is a schematic diagram showing a sand core structure of the sand core of an integral multi-way valve corresponding to the embodiment in FIG. 1.

In some embodiments, after the structural parameters of the valve to be cast are determined, a body model 1 of the integral multi-way valve to be cast may be generated to facilitate more intuitive arrangement of positions of the ingates, the runners, the sprue, the risers, etc., as shown in FIGS. 1 and 2.

Figure 5:
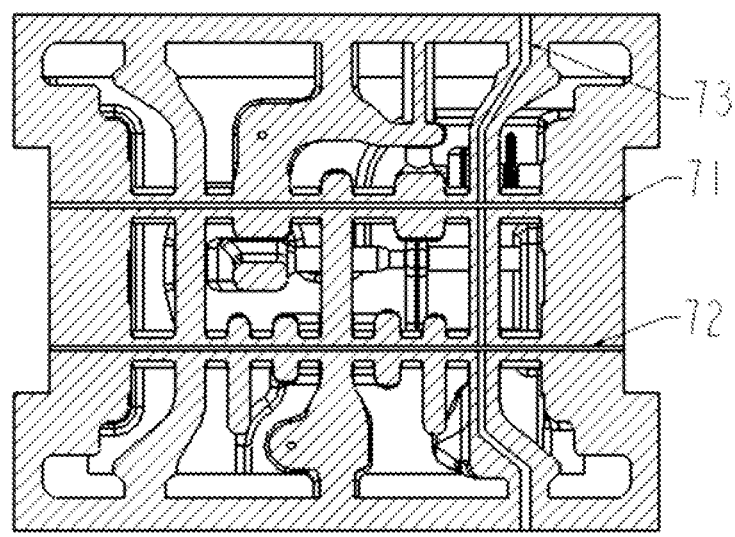
FIG. 5 is a schematic diagram showing an exhaust system of an integral multi-way valve corresponding to the embodiment in FIG. 1.

The method of casting an integral multi-way valve further includes: arranging a through-type exhaust passage in a part of the sand core corresponding to the main valve opening; arranging a conformal exhaust hole in a corresponding part of the sand core corresponding to other valve opening other than the main valve opening and configured to be connected to a sand mold periphery. That is, the path of the exhaust holes is disposed along the central path of the valve openings. The arrangement of the exhaust passage and the exhaust holes can improve the exhaust efficiency of the integral sand core, as shown in FIG. 5.

A 3D sand mold printing process is selected for sand core printing according to the weight of the valve to be cast: if the weight of the valve to be cast is less than or equal to 50 kg, a selective laser sintering technology or a binder jet printing technology is used for sand core 3D printing; if the weight of the valve to be cast is more than 50 kg, the binder jet printing technology is used for sand core 3D printing. Cases such as reduction of broken sand core can be further ensured.

Before pouring, the sand mold obtained by 3D printing is dip coated with zircon powder paint, and then dried. Herein, the zircon powder paint with a Baume degree between 40 and 60 is used for dip coating for not more than 3 times, the drying temperature is 100-180° C., and the drying time is set to be 1-1.5 h.

As for an integral hydraulic multi-way valve, when pouring, nodular cast iron is used for pouring, the pouring temperature is 1350-1400° C., and the thermal insulation time after pouring is more than or equal to 8 h.

The number of layers N of the ingates is determined according to the valve body height L: dividing the valve body height L by a preset height interval L0 taking 100 mm here, and approximately rounding the result obtained to obtain the number of layers N. Approximate rounding may be rounding-off approximation, or may be an integer part of the quotient.

Figure 4:
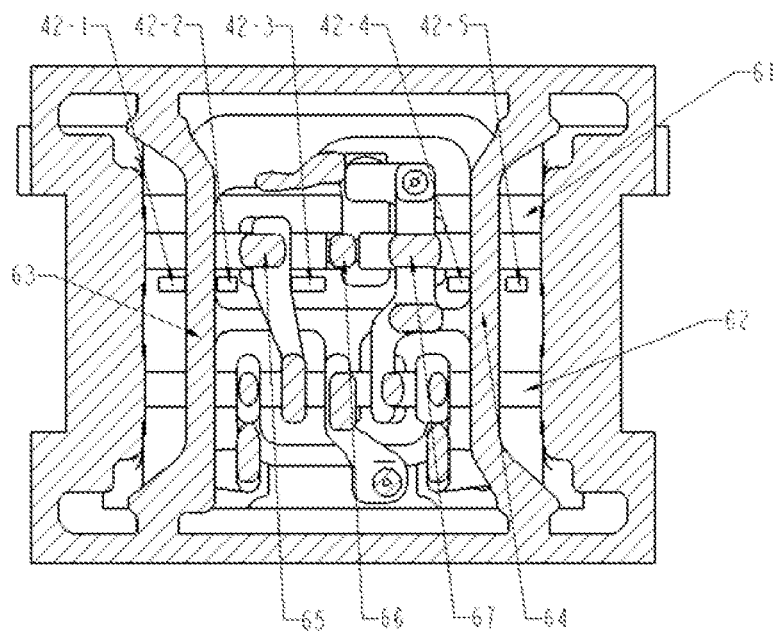
FIG. 4 is a schematic diagram showing distribution of the ingates of an integral multi-way valve corresponding to the embodiment in FIG. 1.

Referring to FIG. 4, different ingates located on the same layer can be disposed at different heights to meet other structural requirements, such as evading structural positions that are not suitable for being directly scoured, including inner oil passages of the sand mold, thus it can ensure that the oil passage part of the sand core will not be directly scoured in the liquid filling process, and casting defects such as broken cores and fins due to the impact of molten iron in the casting process can be reduced.

The embodiment of the present disclosure further provides a system of casting an integral multi-way valve, including a sand mold body, a sprue 2, runners 3, ingates 4 and risers 5.

A direction vertical to an axial direction of a main valve opening part of the sand core is taken as a height direction of a sand mold body.

The sprue 2, the runners 3 and the ingates 4 are disposed on one side of the sand mold body; a plurality of runners are disposed along the height direction of the sand mold body, a plurality of ingates are provided in the extension direction of the runners, and the runners are connected to a sand mold body through the plurality of ingates; the plurality of runners are respectively connected to the sprue, and the risers 5 are disposed on the top of the sand mold body.

The embodiment below will introduce the system of casting an integral multi-way valve as shown in FIGS. 1-5 in detail.

The number of the runners is set to be a result value obtained by approximately rounding the result obtained by dividing the valve body height L by a preset height interval L0=100 mm, for example, in the embodiment as shown in FIGS. 1-5, the number of layers of the runners is 2.

All the ingates connected to a single runner have at least two heights, and each ingate is disposed away from inner oil passages of the sand mold.

A through-type exhaust passage is disposed in a part of the sand core corresponding to the main valve opening.

Parts of the sand core corresponding to other valve openings other than the main valve opening and connected to the sand mold periphery are each provided with a conformal exhaust hole.

A plurality of risers are provided; all the ingates are disposed on a lateral part of one side of the sand mold parallel to the axial direction of the main valve opening. That is, the side where the ingates are located is not the top surface or bottom surface of the sand mold.

That is, referring to FIGS. 1 to 5, the casting system in the current embodiment is a multi-layer composite casting system, using a side-pouring mode, wherein the main valve opening is horizontally disposed to determine a gravity pouring direction, the valve body height L in the gravity pouring direction is measured, the number of layers of the ingates is determined by taking N=L/100 and rounding off N to obtain an integer value, and as shown in FIG. 2, the two layers of ingates are 41 and 42 respectively.

The ingates 4 are arranged on a side of the poured sand mold, the number of ingates on a single layer is not less than 3 between the two layers of main valve openings 61 and 62, as shown in FIG. 4, they are 42-1 to 42-5, and the total number is 5. The heights of different ingates can be different. The ingates evade adjacent inner oil passages such as 63 to 67 to ensure that the oil passage parts of the sand core are not directly scoured in the mold filling process of metal liquid, and reduce casting defects such as broken cores and fins due to the impact of molten iron in the casting process.

The risers 5 are disposed in a conformal manner without considering the draft angle, it can be set as square or round, as shown in FIG. 2, it is set as square, which can better perform feeding inside parts without considering the complexity of manufacturing riser bushes.

Different from the traditional sand-shooting core manufacturing process, the present disclosure adopts the 3D printing process to manufacture the integral sand mold, and there is no bonding gap inside the sand mold, as shown in FIG. 5; the wall thickness of the sand mold periphery is more than or equal to 25 mm, and all parts of the sand core corresponding to main valve openings are provided with through-type exhaust passages for exhausting, as shown by 71 and 72 in FIG. 5; and parts of the sand core corresponding to other valve openings connected with the sand mold periphery are each provided with a conformal exhaust hole, as shown by 73 in FIG. 5, so that the exhaust efficiency of the integral sand core is improved.

The casting system works with a special casting process: the zircon powder paint with a Baume degree set between 40 and 60 is used for dip coating for not more than 3 times, the drying temperature of the sand core is 100-180° C., and the drying time is set to be 1-1.5 h. Nodular cast iron is used for rapid pouring of the integral hydraulic multi-way valve, the pouring temperature is controlled between 1350 and 1400° C., and the thermal insulation time after pouring is more than or equal to 8 h.

Using the casting method and the casting system of the present disclosure to cast the integral multi-way valve has at least one of the following advantages:

Good quality of internal structure. The inner oil passages of the valve body have curved and complicated features. In traditional casting, the sand mold is formed by bonding separated parts, and casting defects such as fins are likely to occur. The present disclosure realizes integrated manufacturing of a sand mold mould, avoids internal bonding of the sand mold, reduces the number of positions of casting defects, and can ultimately improve the casting quality.

High success rate. The success rate of casting the hydraulic multi-way valve by using the sand mold 3D printing technology is generally low in the market. The present disclosure proposes the composite casting system, the number of internal flow passages and the number of layers can be reasonably set according to the specific structural size of the valve body, which effectively reduces the impact of heat flow on the sand core in pouring process and further improves the casting success rate.

Further improved heat-resistant strength of the sand core. Ceramsite sand is selected as raw sand for sand core 3D printing, so that the heat-resistant strength of the sand cores is improved; and the ceramsite sand works with special zircon powder paint, thus further improving the heat-resistant strength of the 3D-printed sand cores and solving the key problem that insufficient strength of the 3D-printed sand cores leads to a low casting success rate.

High flexibility. Based on the 3D printing process, regardless of the complexity of a structure to be printed, the riser form, the riser position and the structural form of the casting system can be designed in a conformal manner to achieve targeted design, without considering the difficulty of sand mold manufacturing, and the design flexibility is significantly improved.

The above description is merely preferred embodiments of the present disclosure. It should be noted that various improvements and variations may also be made for those of ordinary skill in the art without departing from the technical principles of the present disclosure, and these improvements and variations also should be contemplated as being within the protection scope of the present disclosure.

The invention claimed is:

1. A method of casting an integral multi-way valve, comprising:
    obtaining structural parameters of a valve to be cast;
    obtaining a valve body height L of the valve to be cast by taking a direction vertical to an axial direction of a main valve opening as a height direction;
    obtaining a number of layers of ingates according to the valve body height L;
    obtaining positions of various ingates on each layer according to the structural parameters of the valve to be cast;
    arranging ingate models with corresponding layers and positions according to the structural parameters of the valve to be cast;
    respectively arranging runner models connecting ingates corresponding to the ingates on each layer;
    arranging a riser model and a sprue model connecting runners;
    creating a sand core model to be subjected to 3D printing, and a sand mold model comprising the ingates, runners, a sprue and a riser according to the structural parameters of the valve to be cast, the ingate models, the runner models, the sprue model and the riser model;
    performing 3D printing according to the sand mold model and the sand core model to obtain a sand mold and a sand core of the valve to be cast;
    performing pouring by using the sand mold and sand core obtained from 3D printing to obtain an integral valve body;
    arranging a through-type exhaust passage in a part of the sand core corresponding to the main valve opening; and
    arranging a conformal exhaust hole in a corresponding part of the sand core corresponding to other valve openings other than the main valve opening and configured to be connected to a sand mold periphery.

2. The method according to claim 1, wherein determining positions of various ingates on each layer according to the structural parameters of the valve to be cast, so that all ingates are located on the same side of the valve to be cast.

3. The method according to claim 1, further comprising:
  before pouring, dip-coating the sand mold obtained by 3D printing with zircon powder paint, and then drying;
  wherein the zircon powder paint with a Baume degree between 40 and 60 is used for dip coating for not more than 3 times, the drying temperature is 100-180° C., and the drying time is set to be 1-1.5 h.

4. The method according to claim 1, further comprising performing a 3D sand mold printing process for sand core printing according to the weight of the valve to be cast:
  if weight of the valve to be cast is less than or equal to 50 kg, using a selective laser sintering technology or a binder jet printing technology for sand core 3D printing; and
  if the weight of the valve to be cast is more than 50 kg, using the binder jet printing technology for sand core 3D printing.

5. The method according to claim 1, wherein the valve to be cast is an integral hydraulic multi-way valve; when pouring, nodular cast iron is used for pouring, the pouring temperature is 1350-1400° C., and thermal insulation time after pouring is more than or equal to 8 h.

6. The method according to claim 1, wherein the step of determining a number of layers N of the ingates according to the valve body height L is:
  dividing the valve body height L by a preset height interval L0, and approximately rounding the result obtained to obtain the number of layers N;
  wherein different ingates located on the same layer have at least one height.

7. The method according to claim 1, wherein the ingates are disposed away from inner oil passages of the sand mold.

\* \* \* \* \*